(12) United States Patent
Feng et al.

(10) Patent No.: US 11,756,221 B2
(45) Date of Patent: Sep. 12, 2023

(54) IMAGE FUSION FOR SCENES WITH OBJECTS AT MULTIPLE DEPTHS

(71) Applicant: QUALCOMM Incorporated, San Diego, CA (US)

(72) Inventors: Wen-Chun Feng, New Taipei (TW); Hsuan-Ming Liu, New Taipei (TW); Yu-Ren Lai, Nantou County (TW)

(73) Assignee: QUALCOMM Incorporated, San Diego, CA (US)

( * ) Notice: Subject to any disclaimer, the term of this patent is extended or adjusted under 35 U.S.C. 154(b) by 275 days.

(21) Appl. No.: 17/161,355

(22) Filed: Jan. 28, 2021

(65) Prior Publication Data
US 2022/0237813 A1    Jul. 28, 2022

(51) Int. Cl.
*G06T 7/571* (2017.01)
*G06T 7/11* (2017.01)
*G06V 10/10* (2022.01)
*G06T 5/00* (2006.01)
*G06T 5/50* (2006.01)
(Continued)

(52) U.S. Cl.
CPC .............. *G06T 7/571* (2017.01); *G06T 5/002* (2013.01); *G06T 5/50* (2013.01); *G06T 7/11* (2017.01); *G06V 10/10* (2022.01); *H04N 23/67* (2023.01); *H04N 23/90* (2023.01);
(Continued)

(58) Field of Classification Search
CPC ............. G06T 5/50; G06T 2207/20221; G06T 2207/10028; G06T 5/002; G06T 7/593; G06T 7/11; G06T 2207/10012; G06T 2207/10024; G06T 5/003
See application file for complete search history.

(56) References Cited

U.S. PATENT DOCUMENTS 9,344,619 B2    5/2016   Shroff et al.
9,501,834 B2 *  11/2016  Tzur .................... H04N 23/951
(Continued)

FOREIGN PATENT DOCUMENTS

WO    WO-2018214067 A1    11/2018
WO    WO-2021000063 A1    1/2021

OTHER PUBLICATIONS

Co-pending U.S. Appl. No. 17/756,241, inventor Feng; Wen-Chun, filed May 19, 2022.
(Continued)

*Primary Examiner* — Masum Billah
(74) *Attorney, Agent, or Firm* — QUALCOMM Incorporated

(57) ABSTRACT

Image processing performed on images captured with image capture devices may be used to improve upon some of the problems with images captured from devices, including images captured from devices with larger aperture lenses, and, in some particular examples, mobile devices with larger aperture lenses. Multiple images may be captured by the capture device and processing applied to generate a single image through fusing of the multiple images. One potential benefit obtained with fusion of multiple images is a single image with an effective depth of focus (DOF) larger than that available in a single image obtained from the capture device. The DOF of the fused image may be larger than a single image and/or may include multiple distinct in-focus focal distances, whereas a single image from a single capture device has only a single in-focus focal distance.

41 Claims, 8 Drawing Sheets

(51) Int. Cl.
*H04N 23/67* (2023.01)
*H04N 23/90* (2023.01)
*G06V 40/16* (2022.01)

(52) U.S. Cl.
CPC .............. *G06T 2207/10148* (2013.01); *G06T 2207/20221* (2013.01); *G06V 40/161* (2022.01)

(56) References Cited

U.S. PATENT DOCUMENTS

| | | |
|---|---|---|
| 10,582,125 B1 | 3/2020 | Roessler et al. |
| 2008/0175576 A1* | 7/2008 | Hong .................... G03B 13/18 396/89 |
| 2013/0101177 A1 | 4/2013 | Yamada et al. |
| 2015/0062370 A1* | 3/2015 | Shroff ..................... G06T 7/571 348/222.1 |
| 2015/0277121 A1* | 10/2015 | Fridental ............. H04N 13/322 348/54 |
| 2015/0356738 A1* | 12/2015 | Yoon ..................... H04N 23/63 348/47 |
| 2017/0024920 A1* | 1/2017 | Zhang ................. G06V 40/161 |
| 2018/0183986 A1 | 6/2018 | Smith et al. |
| 2018/0332214 A1* | 11/2018 | Katayama .............. H04N 25/75 |
| 2020/0145583 A1* | 5/2020 | Shanmugam .......... H04N 23/62 |

OTHER PUBLICATIONS

International Search Report and Written Opinion—PCT/US2022/070230—ISA/EPO—dated Apr. 22, 2022.
Cao, T., et al., "Multi-Focus Fusion Technique on Low-Cost Camera Images for Canola Phenotyping", Sensors, vol. 18, 1887, Jun. 2018, pp. 1-17, doi:10.3390/s18061887, http://www.mdpi.com/journal/sensors.

\* cited by examiner

IMAGE FUSION FOR SCENES WITH OBJECTS AT MULTIPLE DEPTHS

FIELD OF THE DISCLOSURE

Aspects of the present disclosure relate generally to image processing. Some features of the disclosure may enable and provide improvements in the processing by an image signal processor of output from an image capture device.

BACKGROUND

Image capture devices are devices that can capture one or more digital images, whether still image for photos or sequences of images for videos. Capture devices can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

The quality of images captured by an image capture device can be improved by using large aperture lenses on one or more image sensors of an image capture device. Larger aperture lenses have many benefits, including better low-light performance, which may be beneficial for indoor and night photography, and better Bokeh blur, which may be beneficial for portrait photos. However, large aperture lenses also have a short depth of focus (DOF), resulting in limited portions of a captured image being in focus and the rest of the image having varying degrees of blurriness. When a scene includes many objects at varying distances, an image capture device with a large aperture lens will capture an image with some of those objects out of focus. This may be undesirable, particularly when the out-of-focus objects include other people.

Shortcomings mentioned here are only representative and are included to highlight problems that the inventors have identified with respect to existing devices and sought to improve upon. Aspects of devices described below may address some or all of the shortcomings as well as others known in the art. Aspects of the improved devices described below may present other benefits than, and be used in other applications than, those described above.

BRIEF SUMMARY OF SOME EXAMPLES

Image processing performed on images captured with image capture devices may be used to improve upon some of the problems with images captured from devices, including images captured from devices with larger aperture lenses, and in some particular examples mobile devices with larger aperture lenses. Multiple images may be captured by the capture device and processing applied to generate a single image through fusing of the multiple images. One potential benefit obtained with fusion of multiple images is a single image with an effective depth of focus (DOF) larger than that available in a single image obtained from the capture device. The DOF of the fused image may be larger than a single image and/or may include multiple distinct in-focus focal distances, whereas a single image from a single capture device has only a single in-focus focal distance. The fusion of multiple images may include one or more image processing techniques described such as merging, copying, segmenting, and blending. The fusion of multiple images may be initiated based on criteria, including specific conditions met within a captured image. In one embodiment, a default image capture may include processing a first input frame from a capture device. When conditions are identified in the first image frame, such as two or more peaks separated by a sufficient threshold in a depth data histogram, additional image frames are retrieved for processing, including fusing of the first image frame with the additional image frames. The retrieval of additional frames may trigger additional image captures from the image capture device.

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In different embodiments, hardware and/or software of the digital camera may capture images, process the images, trigger the image fusion, and/or fuse captured images, with some hardware and/or software performing multiple steps between the capturing of the images and the generation of a fused image. In some embodiments, hardware of the digital camera may process captured images, determine that fusion processing should be triggered, capture additional images, and pass those additional images to an image signal processor and/or application processor for further processing, including processing by fusing images. The triggering of the fusion processing may be performed based on predetermined criteria (e.g., a difference in focal distances for objects of interest exceeding a threshold) determined by the hardware, which may be performed in fixed-function hardware and/or a generic processor. In other embodiments, the triggering of the fusion processing may alternatively be performed based on a request from another component in the device, such as by the CPU in response to image processing functions executing on the CPU, in response to user input activating a fusion processing capture mode, in response to determinations by a fixed-function fusion node, or in response to determinations by the image signal processor. In some embodiments, the image signal processor may be in a device separate from the actual image capture components (e.g., the image sensors and the lens) and integrated in a system on chip (SoC) with one or more of a fusion node, central processing unit, memory, and/or storage.

After an output frame representing the scene is generated by fusing multiple image frames, the view of the scene may be displayed on a device display, saved to a storage device as a picture or a sequence of pictures as a video, transmitted over a network, and/or printed to an output medium. For example, the image signal processor may be configured to obtain input frames of image data (e.g., pixel values) from one or more image frames from one or more image sensors, and in turn, produce corresponding output frames of image data (e.g., preview display frames, still-image captures, frames for video, etc.). In other examples, the image signal processor may output frames of the image data to various output devices and/or camera modules for further processing, such as for 3A parameter synchronization, producing a video file via the output frames, configuring frames for display, configuring frames for storage, etc. That is, the image signal processor may obtain incoming frames from one or more image sensors, each coupled to one or more camera lenses, and, in turn, may produce and output a flow of output frames to various output destinations.

In one aspect of the disclosure, a method includes receiving a first image frame representing a scene captured with a first focus at a first focal distance; and determining whether a difference between a first depth for a first portion of the scene and a second depth for a second portion of the scene exceeds a threshold value. When the difference exceeds the threshold value, the method may continue to perform receiving a second image frame captured at a second focal distance different from the first focal distance; and determining an output image frame based on the first image frame and the second image frame. The method for determining an output image frame may include segmenting the output image frame into a first portion and a second portion; and/or applying a blurring algorithm to pixels in the second portion but not the first portion. The method for determining an output image frame may additionally or alternatively include determining a segment of the second image frame corresponding to the second depth; and/or merging the segment with the first image frame to obtain the output image frame. The method for determining an output image frame may additionally or alternatively include copying first image data corresponding to a first set of pixels from a first portion of the first image frame to the output image frame; copying second image data corresponding to a second set of pixels from the segment of the second image frame to the output image frame; and/or determining third image data of the output image frame corresponding to a third set of pixels between the first set of pixels and the second set of pixels, wherein the third image data is determined based on the first image frame, the second image frame, and a weighting value. The weighting values may be determined based on at least one of a contrast value of the first image frame; a distance value corresponding to a distance from a pixel in the third set of pixels to a pixel in at least one of the first set of pixels or the second set of pixels; a first gradient of the first image frame; and/or a second gradient of the second image frame. In some embodiments, the weighting value corresponds to selecting a value for a pixel of the third set of pixels from a first corresponding pixel in the first set of pixels or a second corresponding pixel in the second set of pixels based on whether a gradient at the first corresponding pixel is greater than the second corresponding pixel.

The method may include performing similar operations on more than two image frames. For example, the method may include determining, based on the depth data, a third depth for a third portion of the first image frame; determining whether a second difference between the second depth and the third depth exceeds a second threshold value; transmitting a command to capture a third image frame at a third focal distance different than the second focal distance when the second difference exceeds the second threshold value; receiving the third image frame captured at the third focal distance; and/or determining an output image frame based on the first image frame, the second image frame, and the third image frame.

In an additional aspect of the disclosure, an apparatus is disclosed that includes at least one processor, and a memory coupled to the at least one processor. The at least one processor is configured to perform any of the methods or techniques described herein. For example, the at least one processor may be configured to perform steps including analyzing a first image frame from a capture device, determining whether to retrieve and/or trigger capturing of additional image frames, and/or fusing two or more image frames to generate an output frame. The at least one processor may include an image signal processor or a processor including specific functionality for camera controls and/or processing. The at least one processor may also or alternatively include an applications processor. The methods and techniques described herein may be entirely performed by the image signal processor or the applications processor, or various operations may be split between the image signal processor and the application processor, and in some embodiments additional processor.

In an additional aspect of the disclosure, a device configured for image capture is disclosed. The apparatus includes means for receiving a first image frame representing a scene captured with a first focus at a first focal distance, means for determining whether a difference between a first depth for a first portion of the scene and a second depth for a second portion of the scene exceeds a threshold value, means for receiving a second image frame representing the scene captured with a second focal distance different from the first focal distance; and/or means for determining an output image frame based on the first image frame and the second image frame. The means for determining the output image frame may include means for segmenting, means for merging, means for determining gradient maps, means for determining histogram depth data, and/or means for blending. The apparatus further includes one or more means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), time of flight detectors. The apparatus may further include one or more means for accumulating and/or focusing light rays into the one or more image sensors (including simple lenses, compound lenses, spherical lenses, and non-spherical lenses).

In an additional aspect of the disclosure, a non-transitory computer-readable medium stores instructions that, when executed by a processor, cause the processor to perform operations including those described in the method and techniques described herein. For example, the operations may include receiving a first image frame representing a scene captured with a first focus at a first focal distance; and determining whether a difference between a first depth for a first portion of the scene and a second depth for a second portion of the scene exceeds a threshold value; and when the difference exceeds the threshold value, the instructions may continue to perform receiving a second image frame captured at a second focal distance different from the first focal distance; and determining an output image frame based on the first image frame and the second image frame.

In an additional aspect of the disclosure, a mobile device may include an image sensor, an image signal processor, a fixed-function fusion node, and a central processing unit (CPU) functioning as an application processor (AP). A scene detection scheme may be executed on the AP to detect the existence of multiple regions of interest, such as using depth information as described herein, during a preview operation of a camera application executing on the mobile device. When a capture request is made, such as with a user clicking a shutter button, when multiple peaks on the depth histogram are detected, the AP transmits a signal to camera hardware to capture multiple images and multiple focal planes for further processing. Camera hardware, such as the image sensor, a lens, and an autofocus (AF) system execute an AF bracketing scheme is capture two images. These images may be processed by the image signal processor to enhance the individual images, with both images transmitted from the ISP to the fusion node. The fusion node processes these two images with corresponding depth data based on, for example, a union contour map, the weighting, and combining described herein. The fusion node then outputs a single image file to the AP for display in the camera application, storing in the storage of the mobile device for later display in a gallery application, or otherwise transmitted, stored, or further processed.

In an additional aspect of the disclosure, an apparatus may include a digital camera comprising an image sensor and autofocus (AF) circuitry coupled to the image sensor, in which the AF circuitry is configured to focus the image sensor to a first focal plane, to receive first image data from the image sensor at the first focal plane, to determine distance between objects in the first image data, to determine the distance exceeds a threshold value, to focus the image sensor to a second focal plane, and to receive second image data from the image sensor at the second focal plane. In some aspects, the distance between objects may be determined by determining peaks in a depth data histogram and determining a distance between the peaks as the distance between objects. The depth data histogram may be received from, for example, a depth sensor separate from the image sensor, corresponding second image data from a second image sensor capturing the scene with a different field of view, and/or corresponding second image data from a non-overlapping portion of the image sensor. The first and second image data may be passed to other processing circuitry, such as an image signal processor and/or application processor for performing fusion processing on the first and second image data.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
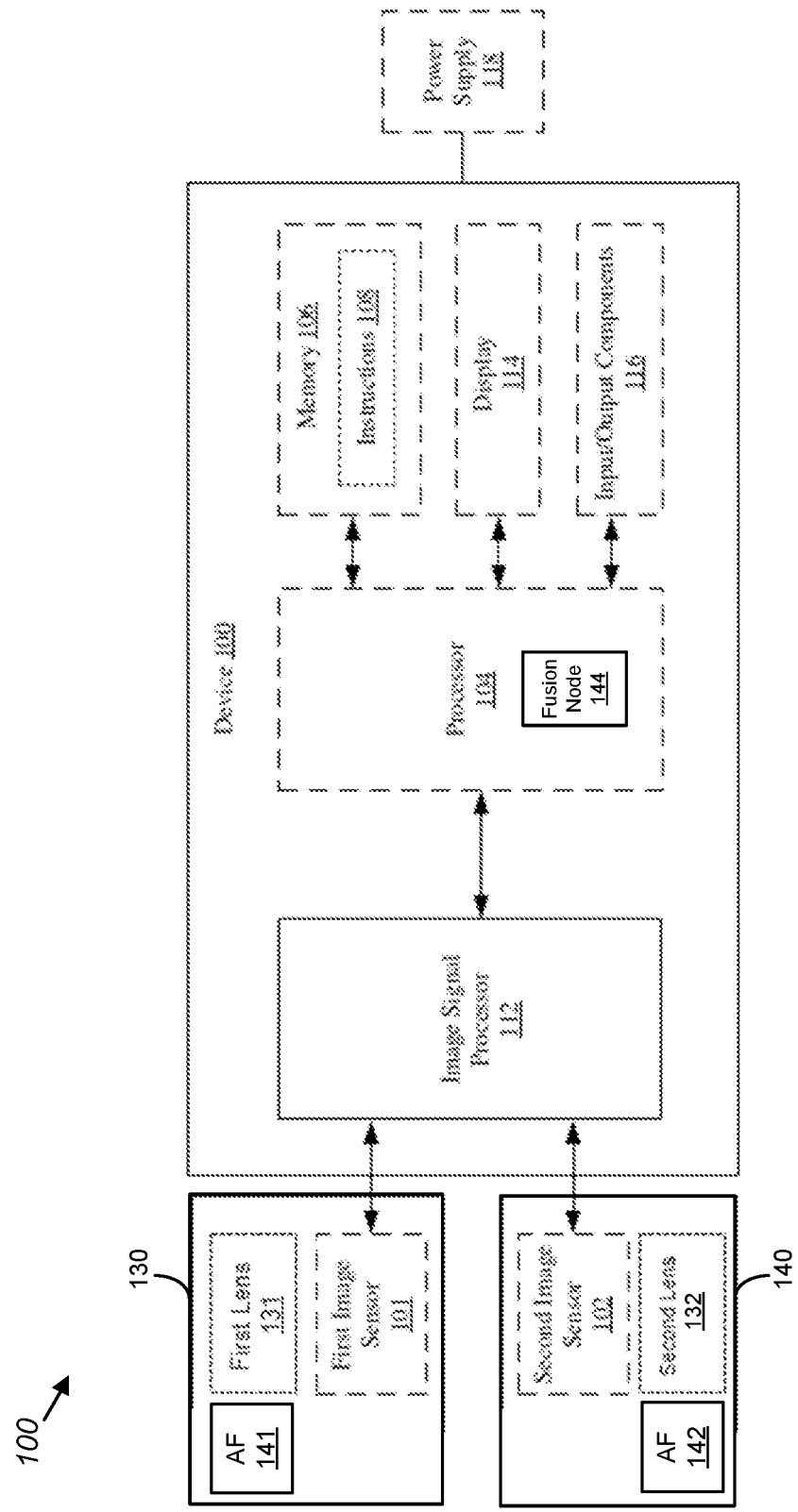
FIG. 1 is a block diagram of a computing device configured to perform one or more of the example techniques described in this disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support improved image quality from an image capture device by capturing multiple images of a scene. The improved methods describe processing multiple images captured of a scene by using fusion logic to combine the multiple images. Those images may be captured using the same capture device with the same device settings, the same capture device with different device settings, and/or capture using different capture devices, resulting in each image providing different information regarding the scene than other captured images of the scene. The different settings for the different image captures may be the result of reconfiguring the device during capture such that the first sensor captures different views of the scene. For example, the first sensor may be configured with a focus at two different focal distances. In some embodiments, an image frame input to the fusion processing described herein is itself a fusion of images output form multiple sensors of the image capture device.

Aspects of the present disclosure may be used for capturing image frames using multiple image sensors of an image capture device. The multiple image sensors may include a combination of ultra-wide (high field-of-view (FOV)), wide, tele, and ultra-tele (low FOV) sensors. That is, each image sensor may be configured through hardware configuration and/or software settings to obtain images of the scene with different portions of the image in focus. Fusion logic in the image capture device, such as within the image signal processor 112 and/or the processor 104, may combine multiple images of a scene to obtain an improved image with multiple focal distances to allow objects at different focal distances to be in-focus in a fused image. This may be beneficial to improve image quality, such as when the image capture device has large aperture lenses resulting in some objects in a scene appearing out of focus in a single image capture.

An example device for capturing image frames, such as a smartphone, may include a configuration of one, two, three, four, or more cameras on a backside (e.g., a side opposite a user display) or a front side (e.g., a same side as a user display) of the device. The devices may include one or more image signal processors, Computer Vision Processors (CVPs), or other suitable circuitry for processing images captured by the one or more image sensors. The one or more image signal processors may provide the processed image frames to a memory and/or a processor (such as an application processor, an image front end (IFE), an image processing engine (IPE), or other suitable processing circuitry) for further processing, such as for encoding or other manipulation.

As used herein, image sensor may refer to the image sensor itself and any other suitable components coupled to the image sensor. For example, an image sensor may also refer to other components of a camera, including a shutter, buffer, or other readout circuitry. The image sensor may further refer to an analog front end or other circuitry for converting analog signals to digital representations for the frame. Therefore, the term "image sensor" herein may refer to any suitable components for capture and readout of an image frame to at least one of a memory, a processor, an image signal processor, or other logic or memory circuitry.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure. Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

In the figures, a single block may be described as performing a function or functions; however, in actual practice, the function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Aspects of the present disclosure are applicable to any suitable electronic device including or coupled to two or more image sensors capable of capturing image frames (or "frames"). Further, aspects of the present disclosure may be implemented in devices having or coupled to image sensors of the same or different capabilities and characteristics (such as resolution, shutter speed, sensor type, and so on).

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

FIG. 1 shows a block diagram of an example device 100 for performing image capture from multiple image sensors. The device 100 may include, or otherwise be coupled to, an image signal processor 112 for processing image frames from multiple image sensors, such as a first image sensor 101 and a second image sensor 102. In some implementations, the device 100 also includes or is coupled to a processor 104 and a memory 106 storing instructions 108. The device 100 may also include or be coupled to a display 114 and a number of input/output (I/O) components 116. The device 100 may further include or be coupled to a power supply 118 for the device 100, such as a battery or a component to couple the device 100 to an energy source. The device 100 may also include or be coupled to additional features or components not shown. In one example, a wireless interface, which may include a number of transceivers and a baseband processor, may be included for a wireless communication device. In another example, one or more other sensors (such as a gyroscope or a global positioning system (GPS) receiver) may be included in or coupled to the device. In a further example, an analog front end to convert analog image frame data to digital image frame data may be coupled between the image sensors 101 and 102 and the image signal processor 112.

The image signal processor 112 may receive image data from a local bus connection to image sensors 101 and/or 102 or by other connections, such as a wire interface to an external image sensor or wireless interface to a distant image sensor. In some embodiments, the device 100 may include a first camera 130 comprising the first image sensor 101 and corresponding first lens 131 and autofocus logic 141 and a second camera 140 comprising the second image sensor 102 and corresponding second lens 132 and autofocus logic 142. The autofocus logic 141 and 142 may be dedicated hardware for adjusting lenses 131 and 132, respectively, to obtain an image frame from the image sensors 101 and 102, respectively, that is focused at a particular focal plane determined by an algorithm of the autofocus logic 141 and 142. In some embodiments, the device 100 may include an interface to receive image data from the image sensors 101 and 102 located apart from the device 100. The device 100 may perform image processing on the image data from a combination of image sensors located within the device 100 or separate from the device 100.

The first image sensor 101 and the second image sensor 102 are configured to capture one or more image frames. For example, the first image sensor 101 and the second image sensor 102 may be included in one or multiple camera configurations (such as a dual camera configuration, a triple camera configuration, and so on, for a smartphone or other suitable device). The image sensors 101 and 102 may also include or be coupled to one or more lenses for focusing light, one or more apertures for receiving light, one or more shutters for blocking light when outside an exposure window, one or more color filter arrays (CFAs) for filtering light outside of specific frequency ranges, one or more analog front ends for converting analog measurements to digital information, or other suitable components for imaging. For example, the first image sensor 101 may be coupled to a first lens 131 and the second image sensor 102 may be coupled to a second lens 132. The first lens 131 and second lens 132 may have different field of views, such as when the first lens 131 is an ultra-wide (UW) lens and the second lens 132 is a wide (W) lens. The device 100 may also include or be coupled to a flash, a depth sensor, a GPS, or other suitable components for imaging. One example configuration for sensors, including sensors 101 and 102, in a multi-image capture device is a UW sensor that has a larger FOV than a W sensor, which has a larger FOV than a T sensor, which has a larger FOV than a UT sensor. For example, a sensor configured for wide FOV may capture fields of view in the range of 64-84 degrees, a sensor configured for ultra-side FOV may capture fields of view in the range of 100-140 degrees, a sensor configured for tele FOV may capture fields of view in the range of 10-30 degrees, and a sensor configured for ultra-tele FOV may capture fields of view in the range of 1-8 degrees.

The image signal processor 112 processes image frames captured by the image sensors 101 and 102. While FIG. 1 illustrates the device 100 as including two image sensors 101 and 102 coupled to the image signal processor 112, any number of image sensors may be coupled to the image signal processor 112. In addition, any number of additional image sensors or image signal processors may exist for the device 100. In some embodiments, the image signal processor 112 may execute instructions from a memory, such as instructions 108 from the memory 106, instructions stored in a separate memory coupled to or included in the image signal processor 112, or instructions provided by the processor 104. In addition, or in the alternative, the image signal processor 112 may execute software and/or may include specific hardware (such as one or more integrated circuits (ICs)) to perform one or more operations described in the present disclosure.

In some implementations, the memory 106 may include a non-transient or non-transitory computer-readable medium storing computer-executable instructions 108 to perform all or a portion of one or more operations described in this disclosure. In some implementations, the instructions 108 include a camera application (or other suitable application) to be executed by the device 100 for generating images or videos. The instructions 108 may also include other applications or programs executed by the device 100, such as an operating system and specific applications other than for image or video generation. Execution of the camera application, such as by the processor 104, may cause the device 100 to generate images using the image sensors 101 and 102 and the image signal processor 112. The memory 106 may also be accessed by the image signal processor 112 to store processed frames or may be accessed by the processor 104 to obtain the processed frames. In some embodiments, the device 100 does not include the memory 106. For example, the device 100 may be a circuit including the image signal processor 112, and the memory may be outside the device 100. The device 100 may be coupled to the memory and configured to access the memory for writing output frames for display or long-term storage.

In some embodiments, the processor 104 may include one or more general purpose processors, sometimes referred to as "cores," capable of executing scripts or instructions of one or more software programs, such as instructions 108 stored within the memory 106. For example, the processor 104 may include one or more application processors configured to execute the camera application (or other suitable application for generating images or video) stored in the memory 106. In executing the camera application, the processor 104 may be configured to instruct the image signal processor 112 to perform one or more operations with reference to the image sensors 101 or 102. For example, the camera application executing on processor 104 may receive a shutter capture command through a tap on a button of graphical user interface (GUI) and instruct the image signal processor 112 to capture one or more image frames. Execution of instructions 108 outside of the camera application by the processor 104 may also cause the device 100 to perform any number of functions or operations. In some embodiments, the processor 104 may include ICs or other hardware in addition to the ability to execute software to cause the device 100 to perform a number of functions or operations, such as the operations described herein. In some other embodiments, the device 100 does not include the processor 104, such as when all of the described functionality is configured in the image signal processor 112. In some embodiments, some image processing and/or camera functionality may be integrated in fixed-function circuitry, such as a fusion node 144, which may be integrated in the processor 104 or contained elsewhere within the device 100, for fusing multiple images according to embodiments described herein.

In some embodiments, at least one of the image signal processor 112 or the processor 104 can execute instructions to perform various operations described herein. For example, execution of the instructions can instruct the image signal processor 112 to capture a first image frame at a first zoom at a first focal distance, and subsequently to capture a second image frame at the first zoom at a second focal distance. The instructions to capture image frames at certain focal distances may be interpreted by the image signal processor 112 to seed an auto-focus algorithm with the instructed focal distance before capturing the image frame.

In some embodiments, the display 114 may include one or more suitable displays or screens allowing for user interaction and/or to present items to the user, such as a preview of the image frames being captured by the image sensors 101 and 102. In some embodiments, the display 114 is a touch-sensitive display. The I/O components 116 may be or include any suitable mechanism, interface, or device to receive input (such as commands) from the user and to provide output to the user. For example, the I/O components 116 may include (but are not limited to) a graphical user interface (GUI), a keyboard, a mouse, a microphone, speakers, a squeezable bezel, one or more buttons (such as a power button), a slider, a switch, and so on.

While shown to be coupled to each other via the processor 104, the processor 104, the memory 106, the image signal processor 112, the display 114, and the I/O components 116 may be coupled to each another in other various arrangements, such as via one or more local buses, which are not shown for simplicity. While the image signal processor 112 is illustrated as separate from the processor 104, the image signal processor 112 may be a core of a processor 104 that is an application processor unit (APU), included in a system on chip (SoC), or otherwise included with the processor 104. While the device 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components, including the device 100.

Methods of processing image frames captured from an image capture device described in embodiments of this disclosure, such as embodiments of FIG. 1, may be used to obtain improved images of a scene and objects in a scene. For example, the methods for fusing image frames may result in obtaining images of a scene with larger depth of focus with multiple objects at different distances from the image capture device being in-focus. One benefit of such fusion processing is that the fusion may allow use of an image capture device with capture devices with larger aperture and shorter depth of focus. These larger aperture lenses, such as lenses with apertures larger than f/2.2 (including apertures of f/2.0, f/1.8, f/1.4, and/or f/1.2), may provide improved image quality in certain situations, such as low-light situations, at the loss of depth of focus. The fusion processing disclosed in embodiments herein allow obtaining the improved image quality with reduced or no loss of depth of focus, such as by generating an output image frame with objects of interest being in-focus. This may be particularly desirable when capturing scenes with multiple people of interest, because the fusion logic described herein can produce images with many or all of the people in focus. Further, the use of the large aperture lenses generates images with blurred backgrounds, sometimes referred to as Bokeh blur or shallow depth-of-field effect. Fusing multiple images from a larger aperture lens can produce an image with multiple objects in focus with the blurred background that is desired by many photographers.

The fusion logic in some embodiments of the disclosure may be triggered under certain conditions, which reduces unnecessary processing of images. Reducing the amount of processing may be particularly beneficial for mobile devices that operate from a limited power supply, such as a battery. The fusion logic may trigger further image capture and processing and merging of multiple images based on criteria that indicate there are multiple subjects of interest in a first captured image of a scene. For example, one criteria indicating multiple subjects of interest is determining that a histogram of depth data from the scene indicates there are multiple objects of interest. The histogram may indicate multiple subjects when multiple histogram peaks are detected and separated by a threshold that is larger than an expected depth of focus for the current camera configuration. As another example, a criteria indicating multiple subjects of interest is the detection of multiple faces or multiple objects through artificial intelligence (AI) machine learning algorithms. As a further example, one criteria indicating multiple subjects of interest is the receipt of user input specifying that fusion logic should be applied and/or specifying multiple objects of interest in a scene. For example, a user may tap several locations on a first image of the scene displayed on the mobile device, and focal depths corresponding to those tapped locations may be used as focal depths for capturing additional image frames of the scene. In some embodiments, combinations of these criteria may be used for triggering the fusion image processing. As one example combination, a histogram of the depth data may be used to determine a plurality of potential objects of interest, each of those potential objects of interest input to a face detection algorithm to determine if the potential objects of interest correspond to people, and then displaying boxes on a display of the first image frame around the detected faces to allow a user to provide user input specifying which of the detected faces correspond to actual objects of interest. As another example combination, a face or object detection algorithm may be used to determine potential objects of interest and the focal depths of those potential objects of interest compared to peaks on a histogram of depth data to determine if the potential objects are far enough apart in distance to trigger capturing additional images. As a further example combination, a portrait segmentation algorithm (including portrait recognition) based on depth information may be used to determine potential objects of interest and the focal depths of those potential objects of interest compared to peaks on a histogram of depth data to determine if the potential objects are far enough apart in distance to trigger capturing additional images. After multiple potential subjects of interest are detected, the fusion logic may command the capturing of additional images at additional focal distances determined using a combination of the depth data for the scene and/or auto focusing systems. When these criteria are not met, the fusion logic does not trigger the capturing of additional images and subsequent processing of those images to reduce the number of operations performed by the image capture device and associated processing and memory circuitry. Similar criteria may be re-evaluated after capturing the additional images to determine which of the additional images to fuse together. For example, all captured images at different focal distances may be displayed on the display and a user allowed to select certain images for fusing. As another example, the captured images at different focal distances may be again input to face or object detection processing to confirm or reject the potential objects of interest as recognized faces or objects.

Figure 2:
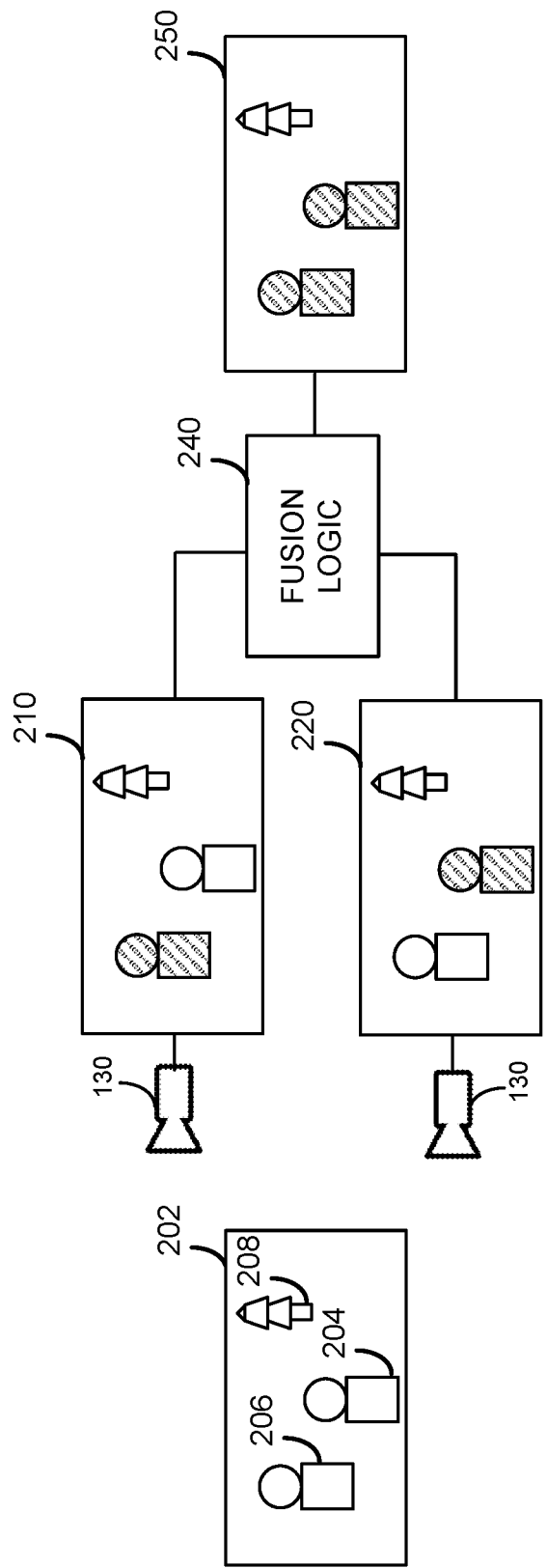
FIG. 2 is a block diagram illustrating fusion of multiple images to obtain a output image frame according to embodiments of the disclosure.

FIG. 2 is a block diagram illustrating fusion of multiple images to obtain an output image frame according to embodiments of the disclosure. A scene 202 may include multiple objects 204, 206, and 208 at different distances from the image capture device. The image capture device 130 may generate a first image frame 210 capturing the scene 202. The first image frame 210 may be focused at a focal distance near the object 204. As a result, the object 204 is in focus and the object 206 appears blurry. The image capture device 130 may generate a second image frame 220 capturing the scene 202. The second image frame 220 may be focused at a focal distance near the object 206. As a result, the object 206 is in focus and the object 204 appears blurry or out of focus. The different image frames 210 and 220 may be captured with different focal distances by seeding an auto-focus (AF) algorithm of the image capture device 130 with focal distances corresponding to the objects 204 and 206. The AF algorithm of the image capture device 130 may process other criteria, such as local contrast or depth data, to obtain the image frames 210 and 220 at a focal distance near the objects 204 and 206. Although the same image capture device 130 is shown capturing the image frames 210 and 220, different image capture devices may be used to capture the two image frames 210 and 220.

Fusion logic 240 may be used to combine the image frames 210 and 220 to obtain an output image frame 250 that can be further processed, displayed to the user, stored in memory, and/or transmitted to other users. An output frame 250 generated by the fusion logic 240 may have object 204 in focus and object 206 in focus. The output frame 250 includes in-focus objects at multiple focal distances, despite neither of the image frames 210 and 220 having both objects 204 and 206 in focus. Processing the image frame 220 with object 206 in focus may include segmenting the image frame 220 to extract the object 206 and merging the segmented object 206 into the image frame 210. The fusion logic 240 may include functionality from one or more of hardware in the cameras 130 and/or 140 (such as AF 141 and/or 142), the image signal processor 112, the processor 104, a fusion node 144 comprising fixed-function circuitry, and/or software executing on the processor 104.

Generating an image frame representing the scene based on multiple image frames and fusion processes, such as described with reference to FIG. 2, takes longer and consumes additional processing time and battery charge level. The fusion process of FIG. 2 may be beneficial for capturing image frames of some scenes. According to some embodiments, whether multiple images of the same scene are beneficial may be determined by examining data corresponding to the captured image frame and determining whether additional image frames, and the number of additional image frames, may improve the output image. One manner of determining whether to capture additional image frames of the scene is by determining distances between objects in an image.

Figure 3:
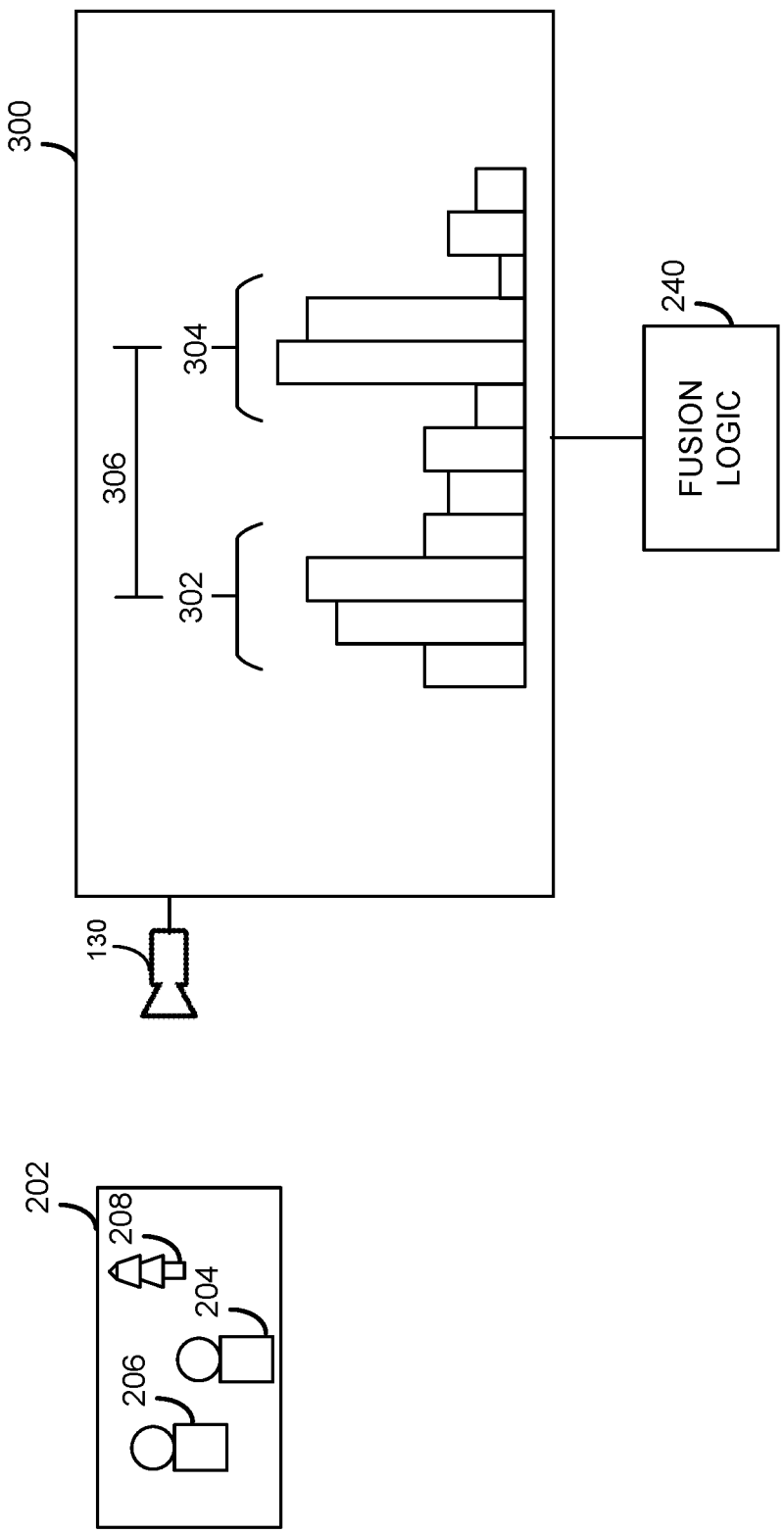
FIG. 3 is a block diagram illustrating an example determination regarding executing fusion logic according to some embodiments of the disclosure.

FIG. 3 is a block diagram illustrating an example determination for executing fusion logic according to some embodiments of the disclosure. Image capture device 130 captures depth data 300 corresponding to scene 202. For example, the depth data 300 may be determined from multiple image frames capturing the scene 202 from different viewpoints. As another example, the depth data 300 may be determined from a depth sensor, such as a time of flight (TOF) sensor, stereo images comprising two or more image frames of the scene captured from different points of view such as from two different image sensors at different locations, and/or light detection and ranging (lidar) using a laser illumination source. In some embodiments, the image capture device 130 that captures the depth data 300 may be the same image capture device that captures the image frames 210 and 220 of FIG. 2. In such embodiments, the autofocus logic 141 and 142 may determine from the depth data 300 whether to capture additional images and use the depth data 300 as an input to the auto focus logic to select a new focal plane for focusing and capturing second or other subsequent image frames. In some embodiments, the image capture device for capturing depth data 300 may be a different capture device, or the depth data 300 may be received without use of an image capture device, such as by retrieving stored depth data 300 from memory and/or receiving depth data 300 from other devices. In such embodiments, the image signal processor (ISP) and/or application processor (AP) may use the depth data 300 to determine further images should be captured and control one or more cameras 130 and/or 140 to obtain a second or subsequent image frame to be used in fusion processing to obtain an output image frame.

The depth data 300 may be input to the fusion logic 240 and analyzed to determine focal distances of interest for capturing image frames. For example, a histogram of the depth data 300 may be determined by determining a number of pixels at various distances from the image capture device or by determining a specific proportion of image pixels in the image or a downsampled image based on an image captured by the image capture device. The fusion logic 240 may determine peaks within the histogram to determine focal distances of interest. For example, the depth data 300 may have histogram peaks 302 and 304. A center of the peaks 302 and 304 may indicate a focal distance for an object, such as a person, when the peaks meet certain criteria, such as exceeding a threshold width and/or value. A distance between the peaks 302 and 304 may be used to determine whether multiple image frames should be captured. For example, the fusion logic 240 may determine whether the difference in distance between detected peaks 302 and 304 is greater than a threshold value. The difference in distance may indicate that the objects in the scene corresponding to peaks 302 and 304 may not both be in-focus within a single image frame captured from image capture device 130.

Figure 4:
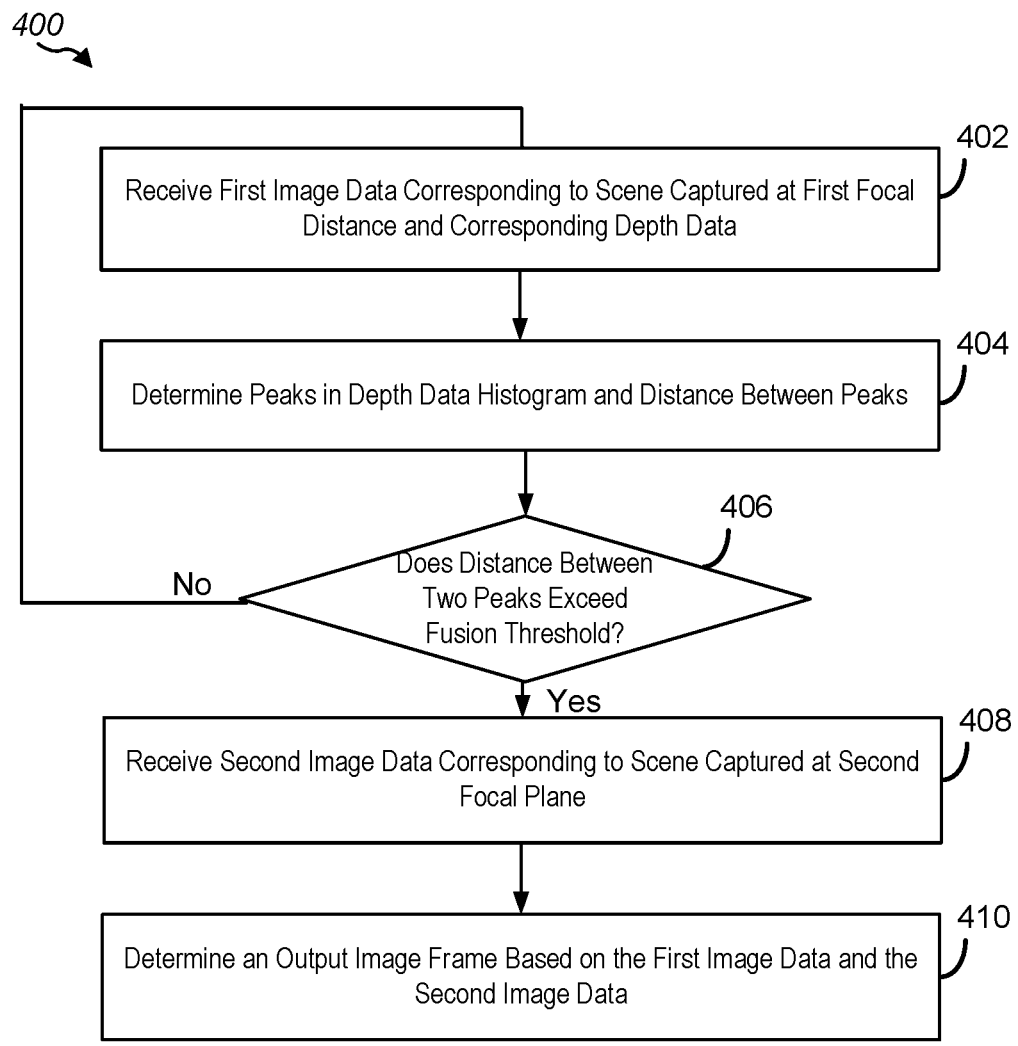
FIG. 4 is a flow chart for a method of processing an image frame with fusion logic according to some embodiments of the disclosure.

A first image frame may be captured from image capture device 130 and analyzed in the fusion logic 240 to determine whether the fusion logic 240 should trigger capturing multiple image frames. The determination may be based on a distance in peaks in a histogram obtained from depth data for the scene. FIG. 4 illustrates a flow chart for a method of processing an image frame with fusion logic according to some embodiments of the disclosure. A method 400 begins at block 402 with receiving first image data for a scene and depth data for the scene. The first image data may correspond to a scene captured at a first focal distance. For example, an auto-focus (AF) algorithm may cause the image capture device to focus on an object in the scene based on contrast detection and/or distance detection. The received depth data at block 402 may correspond to the first image data. For example, the depth data may be a two-dimensional map of depths for each pixel within the first image data.

At block 404, peaks in the depth data histogram are determined along with a distance between the peaks. In some images, each peak may indicate an object of interest within the scene captured in the first image data. In some images, the highest peak may indicate the farthest region, such as the background, and the remaining peaks may each indicate an object of interest within the scene. The number of peaks may thus be used to determine whether additional image frames are captured of the scene, and how many additional image frames should be captured. As a first example, two peaks in the histogram may be determined and a distance between the peaks determined. As another example, three peaks in the histogram may be determined and a distance between each peak and the other peaks determined for a total of six distances determined.

At block 406, the distance between peaks is evaluated to determine whether the distance for any pair of peaks exceeds a fusion threshold value. Each of the distances computed at block 404 may be compared to a fusion threshold value. The fusion threshold value may be a predetermined value. The fusion threshold value may be predetermined based on characteristics of the image capture device that generated the first image data retrieved in block 402. For example, the fusion threshold value may be a value corresponding to a depth-of-focus (DOF) of an image frame obtained from an image capture device. When multiple lenses are available on an image capture device, the fusion threshold value may be determined based on the lens used to obtain the first image data of block 402. Thus, a fusion threshold for images captured from a telephoto (T) lens may be lower than a fusion threshold for images captured from an ultrawide (UW) lens. The fusion threshold values may be stored in a table, and the table used in a look-up operation when receiving the first image data at block 402 and evaluating the data at block 406.

The distance between peaks in a scene determined at block 404 may be used to determine whether additional image frames should be captured and at what focal distances the image frames should be captured. When the fusion logic is activated based on the distance exceeding the fusion threshold value, the method 400 continues to blocks 408 and 410. At block 408, second image data corresponding to the scene captured at a second focal distance is received. The second image data may be received in response to a command transmitted to the image capture device to obtain a second image frame of the scene at a second focal distance different from the first focal distance corresponding to the first image data received at block 402. For example, the command may seed an auto-focus (AF) algorithm in the image capture device with the second focal distance, which may correspond to one of the peaks of the histogram determined at block 404. In some embodiments, the AF algorithm may refine the second focal distance before capturing the second image data received at block 408. In some embodiments, the command may specify the same or a different image sensor for capturing the second image frame.

At block 410, an output image frame is generated by the fusion logic based on the first image data and the second image data. For example, the fusion logic may segment objects from the first image data and the second image data and combine in-focus objects from the first and second image data with background from one or both of the first and second image data. The fusion logic may perform other operations for outputting an output image frame as described herein.

Additional processing may be performed on the output image frame by the fusion logic and/or outside the fusion logic. Example additional processing may include the application of blur to parts of the output image frame. A blurring algorithm may be applied to certain portions of the output image frame based on segmentation data, depth data, and/or other characteristics of one or more of the input image frames. For example, blurring may be applied to background pixels identified based on the depth data. As another example, blurring may be applied to a portion of the pixels corresponding to a foreground segment of one of the input image frames, such as when the foreground segment corresponds to a face. The blurring may be a heavy blur performed to obscure the face or a light blur performed to improve aesthetics of the face. Other examples of additional processing may include color filtering, color mapping, lens effects, transforms, and/or lighting effects. In some embodiments, the blurring may be applied to pixels in a second portion but not a first portion.

Figure 5:
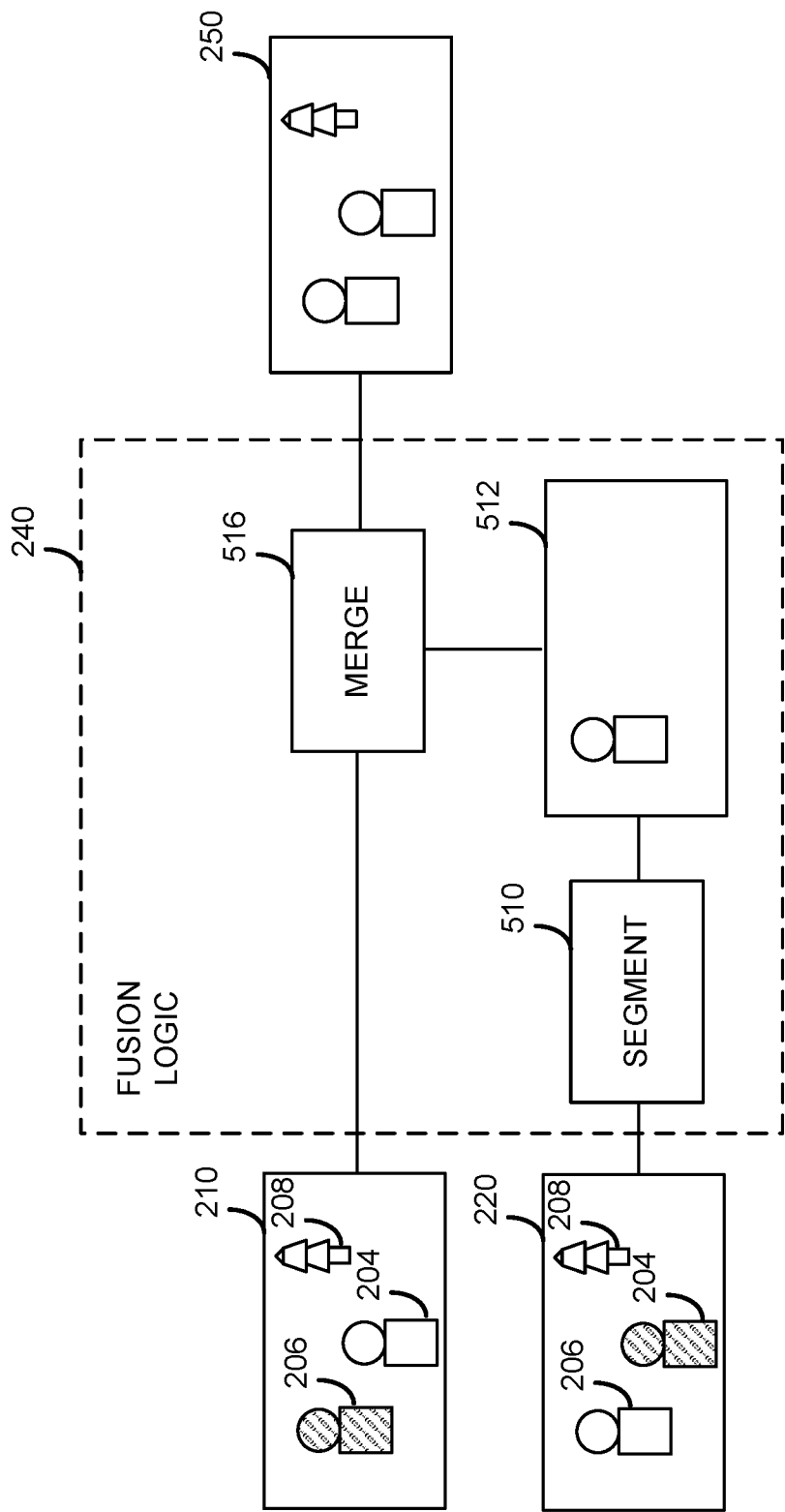
FIG. 5 is a block diagram illustrating segmentation and merging of image data from two image frames to determine an output image frame according to some embodiments of the disclosure.

One method of determining an output image frame from two input image frames is shown in FIG. 5. FIG. 5 is a block diagram illustrating segmentation and merging of image data from two image frames to determine an output image frame according to some embodiments of the disclosure. First input frame 210 and second input frame 220 may be captured and input to the fusion logic 240. In some embodiments, the fusion logic 240 may command the capturing of the first input frame 210 and/or second input frame 220. The input frames 210 and 220 may be processed within the fusion logic 240 to obtain an output image frame 250. The output image frame 250 may have multiple in-focus regions at different focal depths from the image capture device. For example, the output image frame 250 may have two in-focus objects at different depths that exceed the depth-of-focus of the image capture device acquiring either or both of the input image frames 210 and 220.

The fusion logic 240 may use segmentation and merge operations to determine the output image frame 250 from the input image frames 210 and 220. For example, a segmentation 510 operation may determine a portion of pixels of the image frame 220 for merging into the image frame 210. The determined portion of pixels may include pixels identified as corresponding to a particular object within the image frame 220, pixels identified as a foreground portion of image frame 220, and/or pixels identified as an in-focus portion of the image frame 220. The determined portion of pixels may be extracted from the image frame 220 resulting in, for example, a segment 512 made up of the determined portion of pixels. In some embodiments, the segment 512 may be limited to a single continuous region of pixels. In other embodiments, the segment 512 may include multiple regions of pixels, with each region meeting certain criteria applied during the segmentation 510 operation. The segmentation 510 operation may determine boundaries between the segment 512 and the rest of the image frame 220 by analyzing local contrast values, analyzing depth data corresponding to the scene from which image frame 220 is obtained, performing face, object, or portrait recognition on the image frame 220, and/or applying artificial intelligence (AI) machine learning algorithms to the image frame 220.

The segment 512 may be input to a merging 516 operation to merge the segment 512 onto the image frame 210. In some embodiments, the merging 516 operation may overwrite the corresponding pixels of image frame 210 with data from the segment 512. In some embodiments, the merging 516 operation may perform other merge algorithms, which may include combinations of copying pixels from the segment 512 into the image frame 210, blending pixels from the segment 512 into the image frame 210, blending pixels around the segment 512 in the image frame 210 based on the segment 512 to reduce seams between the segment 512 and the rest of the image frame 210, and/or other operations. The merging 516 operation may generate the output image frame 250 with multiple in-focus objects. For example, the segmentation 510 operation may generate a segment 512 including in-focus object 206 and subsequent merging 516 operation may overwrite out-of-focus object 206 in image frame 210 with the in-focus segment 512. Thus, the output image frame 250 includes two in-focus regions with objects 204 and 206.

The example of FIG. 5 may be extended to additional input frames corresponding to different focal distances. For example, the processing of image frames 210 and 220 may be triggered by the detection of two peaks in the depth data histogram exceeding a threshold difference. Upon detecting a third peak in the depth data histogram a third image frame may be captured of the scene. For example, the scene may include a third object at a different focal distance than the objects 204 and 206. A third image frame may be captured at a focal distance approximately the same as or the same as the focal distance for the third object such that the third object is in-focus in the third image frame. The in-focus portion of the third image frame may be segmented and merged with the first input frame, similar to the segmentation 510 and merging 516 of the object 206 in segment 512.

Figure 6:
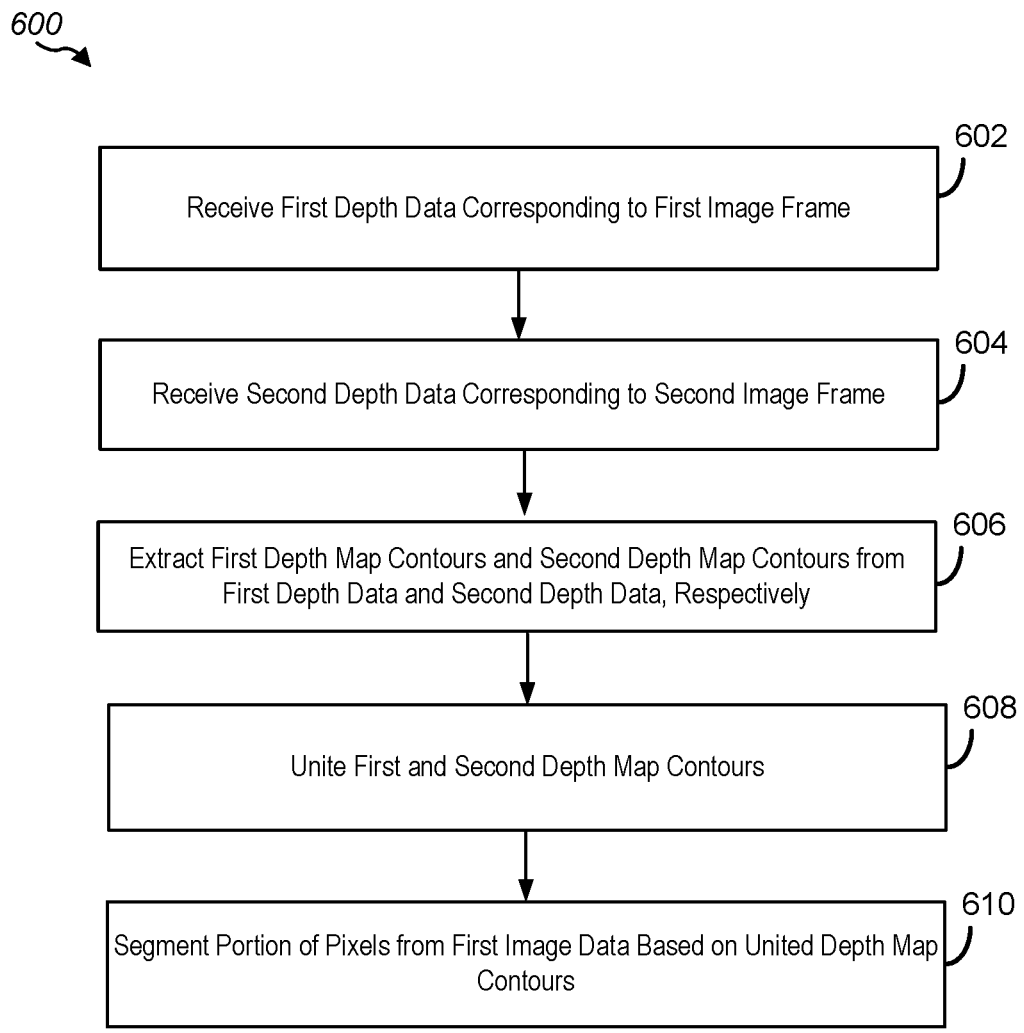
FIG. 6 is a flow chart illustrating segmentation of image data using contour maps according to some embodiments of the disclosure.

One example method of performing the segmentation 510 operation in the embodiment of FIG. 5 or other embodiments of the disclosure may include segmentation based on contours maps. FIG. 6 is a flow chart illustrating segmentation of image data using contour maps according to some embodiments of the disclosure. A segmentation method 600 may begin at block 602 with receiving first depth data corresponding to a first image frame and, at block 604, receiving second depth data corresponding to the second image frame. At block 606, first depth map contours and second depth map contours may be extracted from the first and second depth data, respectively. The contour extraction of block 606 may include applying thresholding on each of the first and second depth data to determine a binarization map.

At block 608, the first and second depth map contours are united. The uniting of block 608 may include combining the two binarized depth maps of block 606 to enlarge the extracted contours of a foreground portion or other portion of pixels, which may avoid artefacts during other operations in the fusion logic. At block 610, a portion of pixels may be segmented from first image data of the first image frame based on the united depth map contours of block 608. A union of two depth maps may be based on AND operations receiving as input the two segmented depth binarized as 255(1) and 0, in which a '1' may indicate a white region (corresponding to a background) and a '0' may indicate a black region (corresponding to a foreground or portrait). The output of the union AND operations may be '1' when the corresponding pixels from two depth maps are all background, with the other regions united as a foreground, black region. The segmented portion of pixels may correspond to segment 512 of FIG. 5. The segmentation may be based on refined depth map contours generated from blocks 606 and 608 and/or other operations on the depth data.

Figure 7:
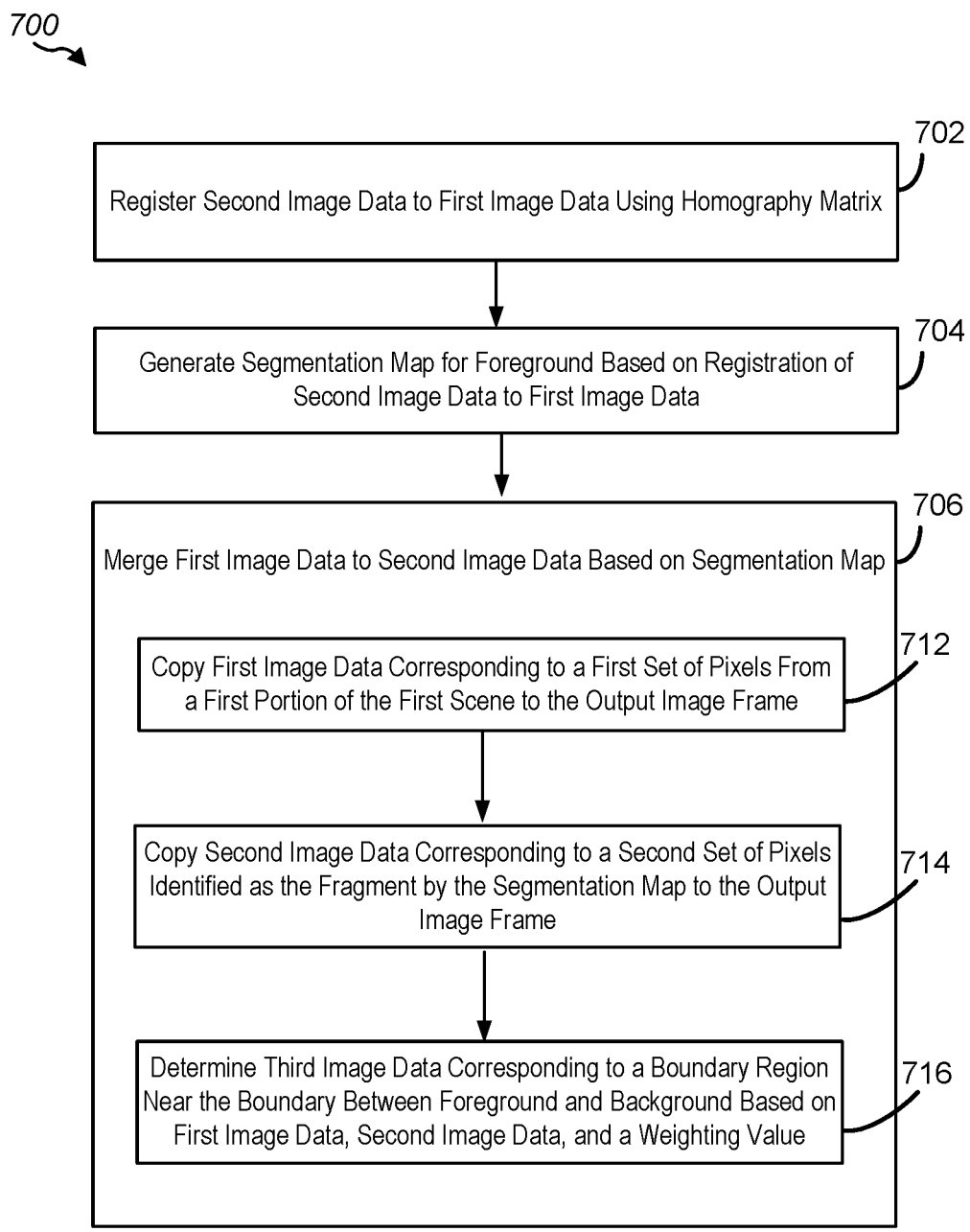
FIG. 7 is a flow chart illustrating merging of image data to determine a fused output image frame based on a weighting value according to some embodiments of the disclosure.

One example method of performing the merging 516 operation in the embodiment of FIG. 5 or other embodiments of the disclosure may include registration operations to align data from the two or more input image frames to allow corresponding pixels between the two image frames to be identified. FIG. 7 is a flow chart illustrating merging of image data to determine a fused output image frame based on a weighting value according to some embodiments of the disclosure. A merging method 700 may begin at block 702 with registering second image data from a second image frame to first image data from a first image frame using a homography matrix. In some embodiments, the second image data may be only a portion of the second image frame, such as segment 512 in the embodiment of FIG. 5. In some embodiments, the second image data may be the entire data set of the second image frame. The registration of first image data to second image data may correlate corresponding pixels of the second image data with pixels of the first image data. The registration may be useful, for example, where objects in the scene have moved in the frame from the capturing of the first image data to the capturing of the second image data. At block 704, a segmentation map is generated for identifying a foreground portion of pixels or other portion of pixels based on the registration of block 702. At block 706, the first image data is merged with the second image data based on the segmentation map.

One example merge operation of block 706 is shown in blocks 712, 714, and 716. In determining an output image frame, first image data corresponding to a first set of pixels from a first portion of the first scene is copied to the output image frame at block 712. This first image data may correspond, for example, to regions of input image frame 210 that are outside the segment 512, such as pixels in the background and/or that are in-focus around object 206. At block 714, second image data corresponding to a second set of pixels identified as the fragment 512 are copied to the output image frame. The copying of data in blocks 712 and 714 may generate an output image frame with merged focus regions from the first and second input image frames. However, some artefacts may remain at the pixels at and around the boundary of the first and second sets of pixels.

If the artefacts are desired to be removed, additional processing may be performed to reduce or remove the artefacts. For example, third image data corresponding to pixels at of near the boundary may be determined based on the first image data, the second image data, and a weighting value. In some embodiments, the third image data may be computed as blended values by combining, for each pixel at or near the boundary, corresponding pixel values from the first image data and the second image data according to a weighting value. For example, a boundary region pixel $p_b$ may be computed as $p_b = \alpha p_1 + (1-\alpha) p_2$, in which $p_1$ is a value from a corresponding pixel in the first image data, $p_2$ is a value from a corresponding pixel in the second image data, and a is a weighting value. In some embodiments, boundary region pixel $p_b$ may be computed based on corresponding pixels from the first image data and second image data that include pixels around the matched pixel, which may add a blur or seam connectivity at the boundary which makes fusion result looks more natural. For example, the boundary pixel $p_b$ at (x,y) may be determined based on the pixel (x,y) from the first image data, the pixel (x,y) from the second image data, the pixel (x−1,y) from the first image data, the pixel (x+1,y) from the first image data, the pixel (x,y−1) from the first image data, the pixel (x,y+1) from the first image data, the pixel (x−1,y) from the second image data, the pixel (x+1,y) from the second image data, the pixel (x,y−1) from the second image data, and/or the pixel (x,y+1) from the second image data. In computing the third image data, each of the pixels from the first image data may be multiplied by the weighting value a and each of the pixels from the second image data may be multiplied by (1−α).

The third image data determined at block 716 may be copied to the output image frame and used to overwrite the first or second image data that would otherwise be included in the output image frame. In some embodiments, an output image frame determined from these techniques may include a first region of focusing on the foreground by copying pixel values from the input image frame focused on the foreground, a second region of focusing on the background by copying pixel values from the input image frame focused on the background, and a third region in which pixel values are fused from the input image frame focused on the foreground and the input image frame focused on the background.

Figure 8:
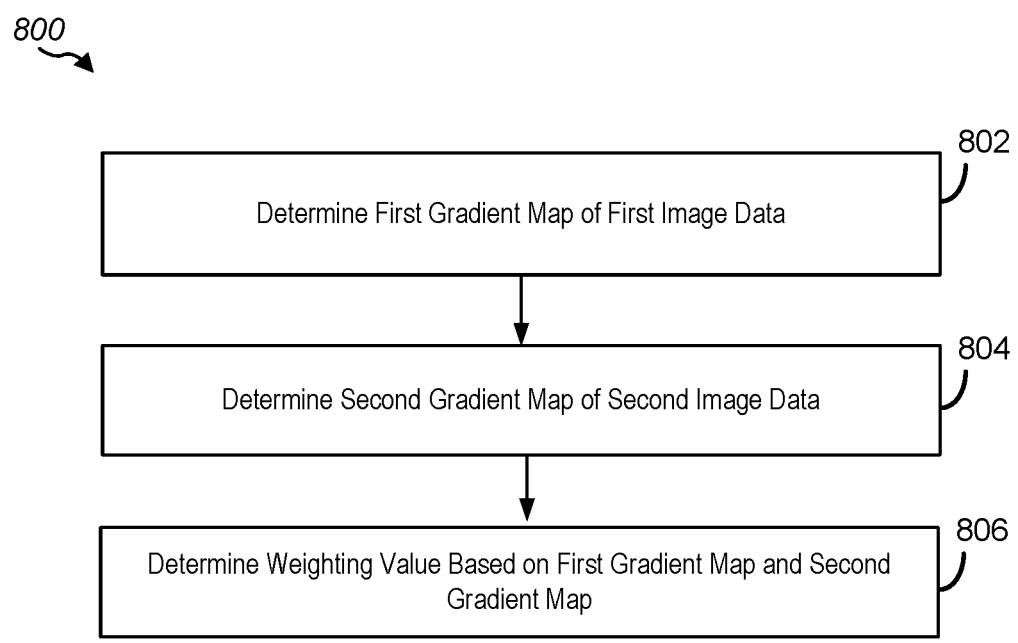
FIG. 8 is a flow chart illustrating generation of weight values based on gradient maps for fusing two image frames according to some embodiments of the disclosure.

The weighting value a may be determined, in some embodiments, based on gradient maps from the first and second input image frames. One method of determining the weighting value is shown in FIG. 8. FIG. 8 is a flow chart illustrating generation of weight values based on gradient maps for fusing two image frames according to some embodiments of the disclosure. At block 802, a first gradient map is determined based on the first image data. At block 804, a second gradient map is determined based on the second image data. One method for determining a gradient map from image data, such as in block 802 and/or block 804, includes applying a Laplacian filter and/or a box filter to determine a gradient map of a foreground image and/or a background image.

At block 806, a weighting value is determined for pixels of the output image frame based on the first gradient map and the second gradient map. The weighing value may be determined from the gradient maps by, for example, by normalizing a difference between the first and second gradient map values to values between [0 . . . 1] or another normalization value such as [0 . . . 255]. The weighting value may alternatively be a binary value, such as 0 or 1, that indicates whether the weighting value should be a normalized value from the first gradient map or a normalized value from the second gradient map. The binary value may indicate whether to use image data from the first image data or the second image data, by effectively weighting the contribution from one of the sets of image data as zero. This binarization may result in selecting a value for a pixel of the third set of pixels from a corresponding pixel in the first set of pixels or a corresponding pixel in the second set of pixels based on whether a gradient at the corresponding pixel in the first image data is greater than a gradient at the corresponding pixel in the second image data. That is, the binarization may select data for a pixel from either the first image data or the second image data based on which has the highest rate of change in the vicinity of the pixel. In another example, the weighting value may be determined based on a combination of values in the gradient map and a distance of those values from a pixel.

In some embodiments, multiple weighting values may be used in the determination of output image frame pixel values. For example, a pixel Y in an output image frame may be determined by the equation:

$$Y=(W_0*W_a*Y(FG))+(W_1*W_b*Y(BG)),$$

in which $W_0$ indicates a normalized gradient (such as between '0' and '1') of a foreground pixel, $W_1$ indicates a normalized gradient (such as between '0' and '1') of a background pixel, $W_a$ is proportional to the distance between the fused pixel in the output image frame and a segmentation boundary, and $W_b$ is proportional to the distance between the fused pixel and a segmentation boundary. The fusion processing may be applied on the union depth map contours between foreground and background determined by a Threshold number of pixels. The weights $W_0$, $W_0$, $W_a$, and $W_b$ may be determined according to the equations:

$$W_0 = \frac{Grad(FG)}{Grad(FG)+Grad(BG)}$$

$$W_1 = \frac{Grad(BG)}{Grad(FG)+Grad(BG)}$$

$$W_a = \frac{(\text{Threshold}-Dist(P))}{\text{Threshold}}, \text{ if } Dist(P) < \text{Threshold}$$

$$W_b = \frac{Dist(P)}{\text{Threshold}}, \text{ if } Dist(P) < \text{Threshold}$$

in which Dist(P) is the distance of pixel P from the boundary, Grad(BG) is the gradient map value at pixel P from the background image frame, Grad(FG) is the gradient map value at pixel P from the foreground image frame, and Threshold may be a value, such as 20 pixels, corresponding to the width of fusion region along with the contour of segmented union foregrounds. The pixels on the other two regions, foreground and background, may be copied from the original first and second image frames without combining. Calculations for the weights $W_a$ and $W_b$ in these example equations may be based on other equations. Other example equations may likewise determine a weight for the fusion processing normalized between 0 and 1, such that $W_a$ approaches 1 and Wb is near zero for fused pixels near the foreground that are similar to connected foreground pixels and such that $W_b$ approaches 1 and $W_a$ is near zero when the fused pixel is the neighbor of the background pixels on the fusion region.

Methods of processing image frames captured from an image capture device described in embodiments of this disclosure may be used to obtain improved images of a scene and objects in a scene. For example, the methods for fusing image frames may result in obtaining images of a scene with larger depth of focus with multiple objects at different distances from the image capture device being in-focus. One benefit of such fusion processing is that the fusion may allow use of an image capture device with capture devices with larger aperture and shorter depth of focus. These larger aperture lenses, such as lenses with apertures larger than f/2.2 (including apertures of f/2.0, f/1.8, f/1.4, and/or f/1.2), may provide improved image quality in certain situations, such as low-light situations, at the loss of depth of focus. The fusion processing disclosed in embodiments herein allow obtaining the improved image quality with reduced or no loss of depth of focus, such as by generating an output image frame with objects of interest being in-focus. This may be particularly desirable when capturing scenes with multiple people of interest, because the fusion logic described herein can product images with many or all of the people in focus. Further, the use of the large aperture lenses generates images with blurred backgrounds, sometimes referred to as Bokeh blur. Fusing multiple images from a larger aperture lens can produce an image with multiple objects in focus with the blurred background that is desired by many photographers.

The fusion logic in some embodiments of the disclosure may be triggered under certain conditions, which reduces unnecessary processing of images. Reducing the amount of processing may be particularly beneficial for mobile devices that operate from a limited power supply, such as a battery. The fusion logic may trigger further image capture and processing and merging of multiple images based on criteria that indicate there are multiple subjects of interest in a first captured image of a scene. For example, when a histogram of depth data from the scene indicates there are multiple objects of interest, such as when there are histogram peaks separated by a threshold that is larger than an expected depth of focus for the current camera configuration, the fusion logic may command the capturing of additional images at additional focal distances determined using a combination of the depth data for the scene and/or auto focusing systems. When these criteria are not met, the fusion logic does not trigger the capturing of additional images and subsequent processing of those images to reduce the number of operations performed by the image capture device and associated processing and memory circuitry.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIG. 1 include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if an apparatus is described as containing components A, B, or C, the apparatus may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method, comprising:
    receiving a first image frame representing a scene captured at a first focal distance;
    determining a first object of interest and a second object of interest in the first image frame;
    determining a depth of the first object of interest as a first depth and a depth of the second object of interest as a second depth, wherein the first depth corresponds to the first focal distance;
    determining a difference between the first depth and the second depth exceeds a threshold value;
    receiving a second image frame representing the scene captured at a second focal distance different from the first focal distance; and
    determining an output image frame based on the first image frame and the second image frame.

2. The method of claim 1, further comprising:
    segmenting the output image frame into a first portion corresponding to the first object of interest and a second portion corresponding to the second object of interest; and
    applying a blurring algorithm to pixels in the second portion but not the first portion.

3. The method of claim 1, wherein determining the output image frame comprises:
    determining a segment of the second image frame corresponding to the second depth; and
    merging the segment with the first image frame to obtain the output image frame.

4. The method of claim 3, wherein merging the segment with the first image frame comprises:
    copying first image data corresponding to a first set of pixels from a first portion of the first image frame to the output image frame;
    copying second image data corresponding to a second set of pixels from the segment to the output image frame; and
    determining third image data of the output image frame corresponding to a third set of pixels in a boundary region between the first set of pixels and the second set of pixels, wherein the third image data is determined based on the first image frame, the second image frame, and a weighting value.

5. The method of claim 4, further comprising determining the weighting value based on at least one of:
    a contrast value in the first image frame corresponding to a pixel in the third set of pixels;
    a contrast value in the second image frame corresponding to a pixel in the third set of pixels; or
    a distance value corresponding to a distance from a pixel in the third set of pixels to a pixel in at least one of the first set of pixels or the second set of pixels.

6. The method of claim 4, further comprising determining the weighting value based on a first gradient of the first image frame and a second gradient of the second image frame.

7. The method of claim 4, wherein the weighting value corresponds to selecting a value for a pixel of the third set of pixels from a first corresponding pixel in the first set of pixels or a second corresponding pixel in the second set of pixels based on whether a gradient at the first corresponding pixel is greater than the second corresponding pixel.

8. The method of claim 1,
wherein determining the first depth comprises determining a depth corresponding to a first peak of a histogram based on the depth data, and
wherein determining the second depth comprises determining a depth corresponding to a second peak of the histogram.

9. The method of claim 8, further comprising transmitting a command to capture the second image frame at the second focal distance corresponding to the second depth.

10. The method of claim 9, wherein the step of transmitting the command comprises seeding an autofocus algorithm with the second focal distance.

11. The method of claim 1, further comprising:
determining a third depth for a third portion of the first image frame;
determining a second difference between the second depth and the third depth exceeds a second threshold value;
receiving a third image frame at a third focal distance different than the second focal distance; and
determining an output image frame based on the first image frame, the second image frame, and the third image frame.

12. The method of claim 1, wherein the receiving the first image frame comprises receiving the first image frame from an image sensor with an aperture greater than f/2.2.

13. The method of claim 1, wherein the receiving the second image frame comprises receiving the second image frame captured by a second sensor.

14. The method of claim 1, further comprising:
determining the first object of interest and the second object of interest in the first image frame based on an object detection algorithm.

15. A device, comprising:
a processor; and
a memory coupled to the processor and storing instructions that, when executed by the processor, cause the device to perform operations comprising:
receiving a first image frame representing a scene captured at a first focal distance;
determining a first object of interest and a second object of interest in the first image frame;
determining a depth of the first object of interest as a first depth and a depth of the second object of interest as a second depth, wherein the first depth corresponds to the first focal distance;
determining a difference between the first depth and the second depth exceeds a threshold value;
receiving a second image frame representing the scene captured at a second focal distance different from the first focal distance; and
determining an output image frame based on the first image frame and the second image frame.

16. The device of claim 15, wherein the instructions cause the device to perform operations comprising:
segmenting the output image frame into a first portion corresponding to the first object of interest and a second portion corresponding to the second object of interest; and
applying a blurring algorithm to pixels in the second portion but not the first portion.

17. The device of claim 15, wherein determining the output image frame comprises:
determining a segment of the second image frame corresponding to the second depth; and
merging the segment with the first image frame to obtain the output image frame.

18. The device of claim 17, wherein merging the segment with the first image frame comprises:
copying first image data corresponding to a first set of pixels from a first portion of the first image frame to the output image frame;
copying second image data corresponding to a second set of pixels from the segment to the output image frame; and
determining third image data of the output image frame corresponding to a third set of pixels in a boundary region between the first set of pixels and the second set of pixels, wherein the third image data is determined based on the first image frame, the second image frame, and a weighting value.

19. The device of claim 18, wherein the instructions cause the device to perform operations comprising:
determining the weighting value based on at least one of:
a contrast value in the first image frame corresponding to a pixel in the third set of pixels;
a contrast value in the second image frame corresponding to a pixel in the third set of pixels; or
a distance value corresponding to a distance from a pixel in the third set of pixels to a pixel in at least one of the first set of pixels or the second set of pixels.

20. The device of claim 18, wherein the instructions cause the device to perform operations comprising determining the weighting value based on a first gradient of the first image frame and a second gradient of the second image frame.

21. The device of claim 18, wherein the weighting value corresponds to selecting a value for a pixel of the third set of pixels from a first corresponding pixel in the first set of pixels or a second corresponding pixel in the second set of pixels based on whether a gradient at the first corresponding pixel is greater than the second corresponding pixel.

22. The device of claim 15,
wherein determining the first depth comprises determining a depth corresponding to a first peak of a histogram based on the depth data, and
wherein determining the second depth comprises determining a depth corresponding to a second peak of the histogram.

23. The device of claim 22, wherein the instructions cause the device to perform operations comprising transmitting a command to capture the second image frame at the second focal distance corresponding to the second depth.

24. The device of claim 23, wherein the step of transmitting the command comprises seeding an autofocus algorithm with the second focal distance.

25. The device of claim 15, wherein the instructions cause the device to perform operations comprising:
determining a third depth for a third portion of the first image frame;
determining a second difference between the second depth and the third depth exceeds a second threshold value;
receiving a third image frame at a third focal distance different than the second focal distance; and
determining an output image frame based on the first image frame, the second image frame, and the third image frame.

26. The device of claim 15, further comprising an image sensor and a lens coupled to the image sensor, wherein the image sensor comprises an aperture greater than f/2.2.

27. The device of claim 15, wherein the receiving the second image frame comprises receiving the second image frame captured by a second sensor.

28. The device of claim 15, wherein the instructions cause the device to perform operations comprising:

determining the first object of interest and the second object of interest in the first image frame based on an object detection algorithm.

29. A non-transitory computer-readable medium storing instructions that, when executed by a processor of a device, cause the device to perform operations comprising:

receiving a first image frame representing a scene captured at a first focal distance;

determining a first object of interest and a second object of interest in the first image frame;

determining a depth of the first object of interest as a first depth and a depth of the second object of interest as a second depth, wherein the first depth corresponds to the first focal distance;

determining a difference between the first depth and the second depth exceeds a threshold value;

receiving a second image frame representing the scene captured at a second focal distance different from the first focal distance; and determining an output image frame based on the first image frame and the second image frame.

30. The non-transitory computer-readable medium of claim 29, further comprising instructions that, when executed by a processor of a device, cause the device to perform operations comprising:

segmenting the output image frame into a first portion corresponding to the first object of interest and a second portion corresponding to the second object of interest; and applying a blurring algorithm to pixels in the second portion but not the first portion.

31. The non-transitory computer-readable medium of claim 29, wherein determining the output image frame comprises:

determining a segment of the second image frame corresponding to the second depth; and merging the segment with the first image frame to obtain the output image frame.

32. The non-transitory computer-readable medium of claim 31, wherein merging the segment with the first image frame comprises:

copying first image data corresponding to a first set of pixels from a first portion of the first image frame to the output image frame;

copying second image data corresponding to a second set of pixels from the segment to the output image frame; and determining third image data of the output image frame corresponding to a third set of pixels in a boundary region between the first set of pixels and the second set of pixels, wherein the third image data is determined based on the first image frame, the second image frame, and a weighting value.

33. The non-transitory computer-readable medium of claim 32, further comprising instructions that, when executed by a processor of a device, cause the device to perform operations comprising:

a contrast value in the first image frame corresponding to a pixel in the third set of pixels;

a contrast value in the second image frame corresponding to a pixel in the third set of pixels; or a distance value corresponding to a distance from a pixel in the third set of pixels to a pixel in at least one of the first set of pixels or the second set of pixels.

34. The non-transitory computer-readable medium of claim 32, further comprising instructions that, when executed by a processor of a device, cause the device to perform operations comprising: determining the weighting value based on a first gradient of the first image frame and a second gradient of the second image frame.

35. The non-transitory computer-readable medium of claim 32, wherein the weighting value corresponds to selecting a value for a pixel of the third set of pixels from a first corresponding pixel in the first set of pixels or a second corresponding pixel in the second set of pixels based on whether a gradient at the first corresponding pixel is greater than the second corresponding pixel.

36. The non-transitory computer-readable medium of claim 29, wherein determining the first depth comprises determining a depth corresponding to a first peak of a histogram based on depth data, and wherein determining the second depth comprises determining a depth corresponding to a second peak of the histogram.

37. The non-transitory computer-readable medium of claim 36, further comprising instructions that, when executed by a processor of a device, cause the device to perform operations comprising: transmitting a command to capture the second image frame at the second focal distance corresponding to the second depth.

38. The non-transitory computer-readable medium of claim 37, wherein the step of transmitting the command comprises seeding an autofocus algorithm with the second focal distance.

39. The non-transitory computer-readable medium of claim 29, further comprising instructions that, when executed by a processor of a device, cause the device to perform operations comprising:

determining a third depth for a third portion of the first image frame;

determining a second difference between the second depth and the third depth exceeds a second threshold value;

receiving a third image frame at a third focal distance different than the second focal distance; and determining an output image frame based on the first image frame, the second image frame, and the third image frame.

40. The non-transitory computer-readable medium of claim 29, wherein the receiving the second image frame comprises receiving the second image frame captured by a second sensor.

41. The non-transitory computer-readable medium of claim 29, further comprising instructions that, when executed by a processor of a device, cause the device to perform operations comprising:

determining the first object of interest and the second object of interest in the first image frame based on an object detection algorithm.

* * * * *